United States Patent

[11] 3,589,692

[72] Inventor Ira W. Lakin
 Volant, Pa.
[21] Appl. No. 752,327
[22] Filed Aug. 13, 1968
[45] Patented June 29, 1971
[73] Assignee Pennsylvania Engineering Corporation
 New Castle, Pa.

[54] HOT SCRAP CHARGING
 13 Claims, 7 Drawing Figs.
[52] U.S. Cl. .................................................. 263/40,
  75/43, 214/18
[51] Int. Cl. ............................................... F27b 3/06
[50] Field of Search............................................ 75/43, 44;
  214/18; 263/40

[56] References Cited
UNITED STATES PATENTS
2,624,565 1/1953 Kompart ...................... 214/18 X
3,390,872 7/1968 Clochetto..................... 263/40 X
3,421,640 1/1969 Falk ............................ 214/18
3,439,909 4/1969 Richards...................... 75/44

Primary Examiner—John J. Camby
Attorney—Green, McCallister & Miller

ABSTRACT: At an initial station, cold scrap is introduced into a group of scrap boxes or containers and weighing is accomplished to assure charges of desired sizes. The containers or scrap boxes are, during the charging, positioned on an inclined plane and are carried or hoisted in such an angular relation and placed in such a relation on a charging machine or car. The charging machine is movable along a charging floor between the furnaces and a preheating station for the scrap material. Metal scrap is preheated in the boxes or containers while they are positioned on the charging machine or car; the car is then moved into alignment with one of the furnaces for introducing preheated scrap thereto by pivoting one of the boxes into a reverse angular relation.

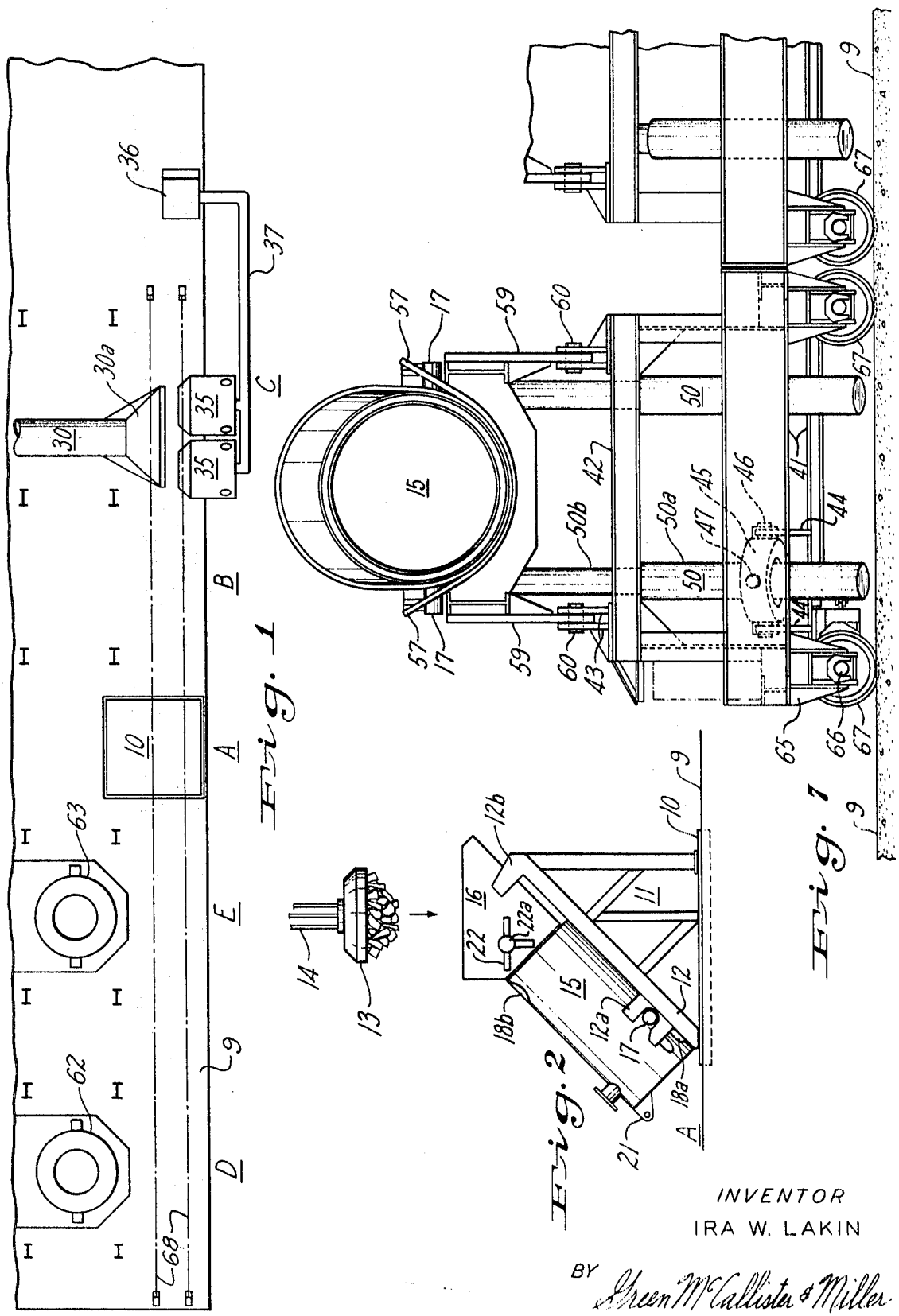

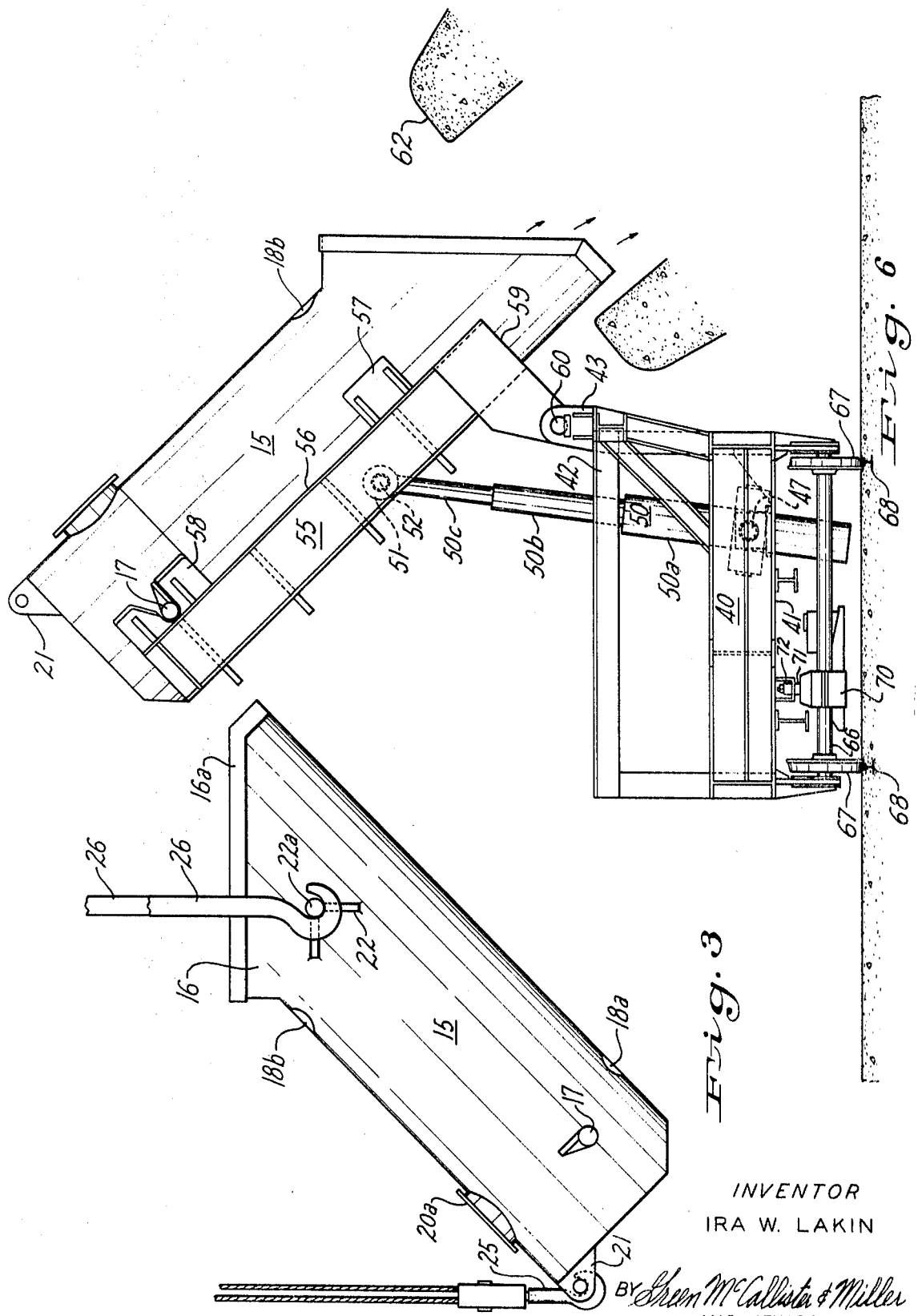

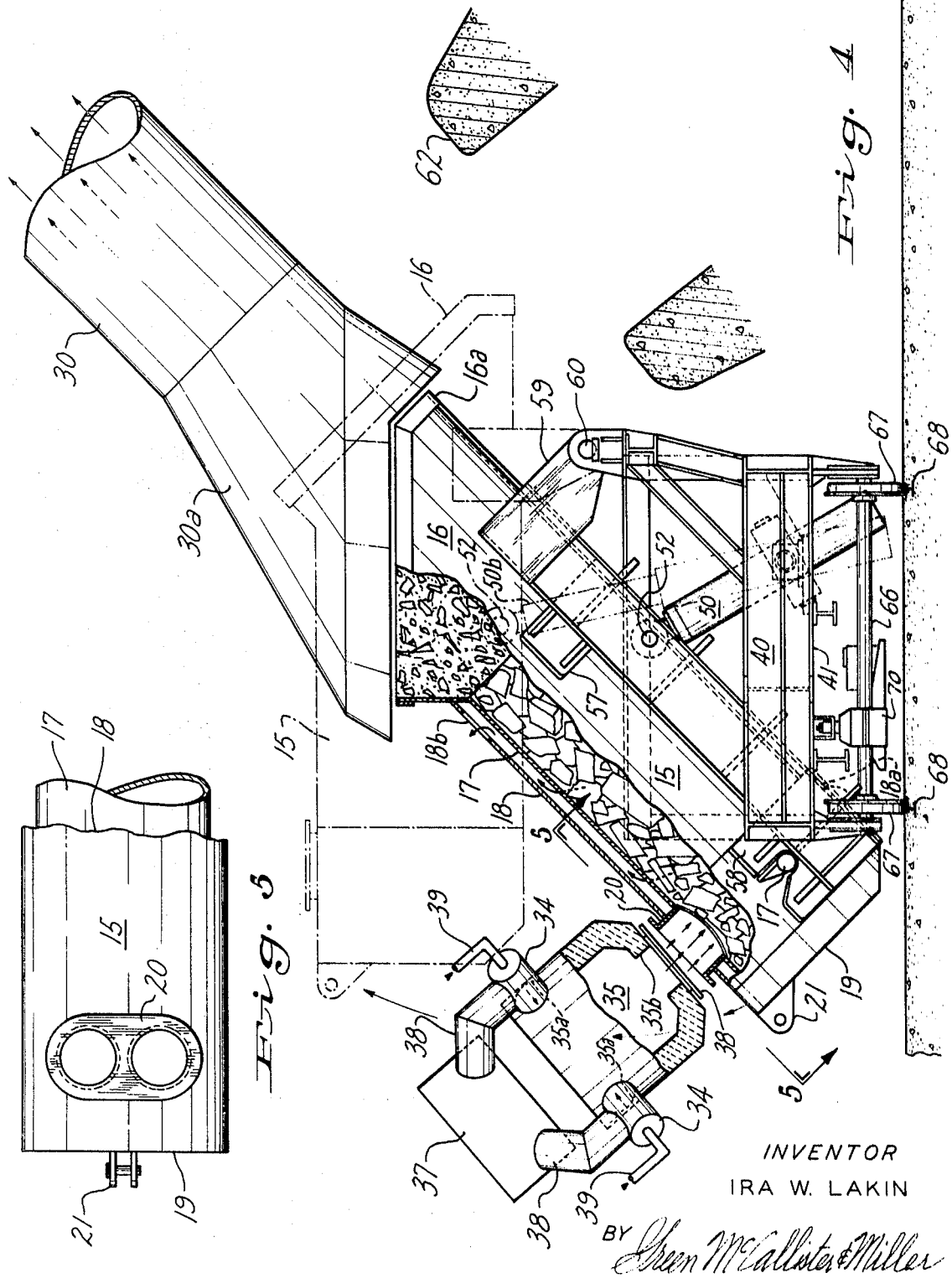

3,589,692

HOT SCRAP CHARGING

This invention relates to the charging of metal melting and refining furnaces with scrap material and particularly, to an improved approach to the charging, utilizing, and preheating of scrap metal. A phase of the invention deals with improved procedure and apparatus for charging furnaces, such as oxygen blow converter vessels that are used for melting and refining metals such as steel.

In recent years those skilled in the art have gravitated towards the employment of so-called oxygen converter vessels for refining basic metal, such as steel, in preference to the older, open hearth furnaces, due particularly to cost and time factors. Electric furnaces are used in the field of melting and refining alloy metals. During the period when those skilled in the art were employing open hearth furnaces for the majority of their steel requirements, extensive use was made of scrap metal. Scrap metal has become increasingly available by reason of the continued junking of heavy appliances, equipment, automobiles, etc. From a purely aesthetic point of view, utilization of this scrap metal is essential. However, since it has been found to be uneconomical to use as high a percentage of scrap in a furnace charge for a converter vessel as has been ordinarily used in an open hearth vessel, scrap metal has become more or less of "a drag on the market."

The present invention has been devised to maximize the economical and practical utilization of scrap metal in modern furnaces, such as those of the oxygen converter type, so as to provide a less expensive source of raw material, to conserve available natural resources and to minimize today's aesthetic problem as to scrapped vehicles, etc.

In view of the above and other considerations, it has been an object of the invention to develop new and improved procedure for handling scrap metal charges and to develop improved apparatus for carrying out such a procedure.

Another object of the invention has been to solve the problem of making maximum use of scrap metal as a percentagewise charge for a furnace vessel.

A further object of the invention has been to develop apparatus and procedure for bringing the temperature of scrap material up to a suitable furnace charging heat and in such a manner that it can be accomplished well within the time involved in melting and refining a charge in one furnace of a group of furnaces.

A still further object of the invention has been to provide apparatus and procedure for preheating scrap material in a charging bucket or container and for discharging scrap metal, as preheated in a scrap container, directly into a melting and refining furnace.

These and other objects of the invention will appear to those skilled in the art from the illustrated embodiment and the claims.

In the drawings, FIG. 1 is a top plan view showing a plant layout or system employing principles of the invention.

FIG. 2 is a reduced side view in elevation illustrating an initial station of the plant layout or system of FIG. 1 at which scrap metal is introduced into the mouth of upwardly tilted containers or buckets and is weighed preliminary to being moved to an upward tilted position on a charging machine or car.

FIG. 3 is a perspective view in elevation of the scale of FIG. 1 illustrating how a filled scrap container may be moved from a charging station to a charging machine and also, when empty, from the charging machine back to the charging station.

FIG. 4 is an end view in elevation and partial section on the scale of FIG. 3 and taken at a preheating station showing a pair of filled scrap containers on a charging machine at the scrap preheating station shown in FIG. 1.

FIG. 5 is a sectional detail on the scale of FIG. 4 and taken along the line 5-5 of FIG. 4.

FIG. 6 is an end view in elevation on the scale of FIG. 4, illustrating the charging machine at a furnace charging position with a scrap container swung to a reverse-tilted position for discharging preheated scrap into the mouth of a furnace.

And FIG. 7 is a fragmental front side view in elevation on the scale of and taken from the right side of FIG. 6; this view shows a scrap container in a substantially horizontal position.

In FIG. 1, a system or plant layout is shown for particularizing the concept of the invention. Five operating stations or zones are shown in which station A represents a scrap loading and weighing zone, station B represents a charging machine loading zone, C represents a scrap preheating zone, and D and E represent metal-melting and refining furnace zones. Two furnace zones or stations are disclosed to indicate the coordination in operation which may be accomplished utilizing scrap preheating in accordance with the invention.

In the first step, as particularly shown in FIG. 2, a group of scrap boxes, cylinders or containers 15 is positioned in a vertically inclined plane on a charging stand 11 at station A. The stand 11 has a backwardly-downwardly declining and upwardly-forwardly sloped platform part 12 provided with a pair of transversely spaced-apart bifurcated wings or ears 12a adjacent its lower end and a pair of transversely spaced-apart upwardly projecting wings 12b at its front end for holding an associated scrap bucket 15 in position thereon. In this connection, it will be noted that each scrap bucket 15 has a pair of outwardly projecting guide pins 17 adjacent its rear end portion that are adapted to fit within an associated pair of bifurcated wings 12a. The stand 11 may, for conservation of floor space and for simplicity of weighing, be positioned on a platform 10 of a conventional platform type of weighing scale, in order that the amount of scrap metal charged into each container may be properly proportioned for requirements by subtracting the necessary tare.

Cold metal scrap may be moved from a scrap pile by any suitable means, such as an electromagnet 13 and a cable 14 of an overhead gantry or crane to fill each container 15 through its upwardly projecting, outwardly enlarged, open end or mouth part 16. After a pair of scrap buckets, cylinders or boxes 15 have been suitable charged at station A, then each as filled may then be lifted or moved upwardly off of the stand 11 in the manner shown in FIG. 3 for positioning it in a similarly sloped relation on a charging machine or car 40.

As shown in FIGS. 6 and 7, the charging machine 40 may have a pair of carriage frames 55 for receiving one of a pair of scrap containers 15. The containers 15 are preferably moved in their upwardly inclined position by conventional overhead crane and hoist means, such as by hoist hook 25 that engages a rear end eyelet lug 21 and a pair of crane hooks 26 that engage a pair of outwardly projecting forwardly positioned pins 22a of a pair of side mounts 22. As shown particularly in FIGS. 6 and 7, each container 15 is securely positioned to project or incline upwardly from a backside of the charging machine 40 between side channel members 56 of a carriage frame 55, between a forward pair of upwardly projecting guide wings 57 and a pair of backwardly positioned, upwardly projecting bifurcated wings or ears 58 within the latter of which mounting guide pins 16 are adapted to rest and latch-engage.

The charging machine 40 receives a pair of filled scrap boxes 15 at station B and is then moved on its wheels 67 along a longitudinal trackway 68 on plant floor 9 to a scrap preheating station or zone C, see particularly FIG. 1. At station C, as illustrated in Fig. 4, upper or mouth part 16 and rim flange 16a of each scrap bucket 15 is in a closely adjacent, gas-delivering alignment with a lower, enlarged open-end portion 30a of an exhaust hood 30 which leads to a plant stack or chimney. At station C, a heater or combustion chamber unit 35 is provided and lined with refractory material. This unit is supplied by a blower 36 with air through ductwork 37 and with gas through pipeline 39 at a group of circumferentially positioned mixers or burners 34. The burners 34 are open tangentially at 35a into the upper portion of the heater 35 to give a swirling type of burning gas movement therewithin. The heater or combustion chamber unit 35 has an outlet port 35b at its lower converging end which delivers hot, preheated gas through a pair of passageways in a dual passageway outlet fitting 38 and, in turn, through a pair of inlet ports 20a of an inlet fitting 20 on the back end portion of a cooperating scrap container 15. In this manner, hot gas at a suitable preheating temperature of, for example, about 2,500° F may be introduced into the bottom portion of a scrap charge within the container 15 and then moved upwardly through the interstices of the scrap within the chamber defined by an inner liner part 17 thereof to thereby drive off moisture and lower melting point or more volatile impurities and heat the scrap as it progressively moves upwardly towards the open mouth part 16.

As shown particularly in FIG. 4, heavier scrap is preferably carried within the main cylinder chamber defined by inner metal liner 17 which may be of a suitable heat resistant alloy steel. Relatively lightweight scrap pieces of metal are carried within the upper mouth part 16 thereof. This has the advantage of subjecting the heavier masses to the greatest heat with the result that the smaller or lighter weight portions of the scrap charge as well as the heavier parts or masses of the charge are preheated to a maximum temperature, but below a temperature at which they become tacky or sticky, for example, below about 1,500° F. Cooled gas entering the hood 30 will have a temperature in the neighborhood of 300° to 400° F. The average temperature of the scrap, as equalized during a slight holding period, approaches about 1,100° F which has been found to be satisfactory in charging a furnace, such as an oxygen blow converter shown at stations D and E of FIG. 1.

As shown in FIG. 4, each container 15 has a heavy, reinforced, metal closing off back end wall 19, a metal alloy inner liner wall 17, and a metal, outwardly spaced, concentric, outer shell wall 18 to provide a circulating air space therebetween. Air may flow from inlet port 18a upwardly along the space and out through outlet port 18b. In this manner, the main, lower or cylindrical portion of each container 15, may withstand even temporary excessive temperatures and will have an excellent operating life using ordinary preheating temperatures.

As shown in FIG. 1, I preferably provide a pair of hat gas supply units 35 or, in other words, one for each scrap container 15. This speeds up the operation and makes two scrap charges fully ready for delivery to a furnace at the same time. The preheated charges are then moved in their containers 15 by the charging machine 40 along trackway 68 to a position in front alignment with one of the furnaces 62 or 63. FIG. 6 illustrates movement which has been accomplished to station D for charging furnace 62. The furnace 62 may then be charged through its mouth by first aligning one scrap box 15 therewith and then swinging such scrap box into a reverse inclination or, in other words, from a backwardly declining position through an arc into a forwardly declining position such that the mouth part 16 will be in a charging position with respect to the open mouth of furnace 62. Such movement is accomplished by a mechanism illustrated in FIGS. 6 and 7.

It will be noted that the charging machine 40 has a lower frame structure 41 and an upper frame structure 42. A spaced pair of bifurcated mounts 43 (see Fig. 7) extend upwardly from the delivery side of the upper frame 42 to receive a spaced pair of swing arms 59 that are secured to project downwardly from a front end of each swing carriage 55. Pivot pins 60 mount each arm 59 within an associated bifurcated mount 43, as also shown in FIG. 6. For angularly swinging or raising and lowering each carriage 55, a pair of fluid operated tilt motors or power units 50 are provided. These power units are shown of a fluid-operated, telescopic-cylinder type such as commercially available and which may be actuated by either air or preferably by hydraulic fluid. As shown particularly in FIG. 6, the units 50 are constructed to swing from an angle of about 60° off the horizontal to about 10° beyond the vertical in moving a scrap box 15 from a preheating position to a furnace charging position and, in doing so, first move or extend hollow plunger or piston 50b from main, outer housing or cylinder 50a and then extend inner or solid plunger or piston 50c from within the hollow plunger 50b. The innermost piston or plunger 50c has an eyelet 51 on its upper end which is pivotally secured to a side of an associated carriage 55 by a pivot pin 52. The location of the pin 52 is in a spaced relation behind the position of the swing pin 60 but forwardly of the longitudinal midpoint of the carriage 55.

As shown in FIG. 6, each tilt motor 50 has to, itself, swing during its operation. Thus, it has a bottom swing mounting of a so-called Gimbal type, as particularly illustrated in FIG. 7. In this connection, a pair of spaced-support arms 44 that are secured to the bottom frame 41 of the charging machine 40, pivotally carry a pair of pivot pins 46 that project from opposite sides of a cylindrical collar. The collar 45 is loosely positioned over outer cylindrical or housing part 50a and is secured at opposite side thereof by a pair of pivot pins that project from opposite sides of the outer part 50a.

The charging machine 40 is preferably motorized for electrical drive, as shown in FIG. 6. The lower frame 41 is provided with front and backs pairs of downwardly projecting mounts 65 for receiving an axle shaft 66 on which a pair of flanged track wheels 67 are secured. A self-contained axle-mounted electrical motor drive unit 70 is secured by mounting bracket 72 and mounting pin assembly 71 to the underside of the frame 41. Each charging machine 40 has at least one axle shaft 66 that is thus driven. It will be noted that there are four axles (two truck pairs) on the machine, as constructed t carry a pair of scrap containers 15.

Although a specific embodiment of apparatus and a system for practicing the invention have been set forth to illustrate the invention and its application to the art, it will be apparent to those skilled therein that various changes, additions, subtractions and modifications may be made without departing from its spirit and scope.

I claim:

1. In a method of handling metal scrap material for charging it into an open mouth of a melting and refining furnace vessel, introducing the scrap material into a container having a closed-off bottom end portion and an open top end portion, positioning the material on a backwardly downwardly declining plane within the container while preheating the material within the container by passing hot gases upwardly through the material from adjacent the bottom end portion of the container and out of the open top end portion thereof, moving the preheated material within the container to a charging position with respect to the open mouth of the furnace vessel, and tilting the container with the preheated material therein through an arc into a forwardly downwardly declining plane and charging it into the open mouth of the furnace vessel.

2. In a method as defined in claim 1, also positioning the material on the backwardly declining plane while introducing the scrap material into the container.

3. In a method as defined in claim 1, moving the container with scrap material therein on the backwardly-downwardly declining plane to a supported position on a charging machine in which the container is substantially retained on said plane, passing the hot gases through the scrap material in the container while it is positioned on the charging material, moving the charging machine to an aligned position with the furnace vessel, and then tilting the container on the charging machine through the reverse plane.

4. In a method as defined in claim 1, repeating the defined steps to the preheating of the scrap material, thereafter moving the container with the preheated material therein into alignment with the open mouth of a second similar furnace vessel, and then charging preheated scrap from the container into the second vessel by tilting the container through a reverse plane to a forwardly-downwardly declining position.

5. In a method as defined in claim 1, weighing the scrap material in the container after the material has been introduced and therein and before passing hot gases upwardly through the material.

6. In a method as defined in claim 1, providing the hot gases by introducing air and combustion gas in tangential positive flow paths into a combustion chamber, burning the gases within the combustion chamber and passing them under positive pressure out of a bottom end of the combustion chamber into the container.

7. In a method as defined in claim 1, introducing the scrap material into the container in a graduated manner such that heavier weight portions thereof extend upwardly from the bottom end portion and lighter weight portions extend upwardly adjacent the open end portion thereof, whereby hot gases entering container will first pass through and heat the heavier weight portions of the scrap material and finally heat lighter weight portions thereof.

8. In the processing of metal scrap from a scrap pile into a line of melting and refining furnace vessels each having an open mouth; providing a loading and weighing station, a scrap material preheating station providing a loading stand having a downwardly-backwardly declining frame, placing a pair of substantially cylindrical scrap containers having closed bottom end portions and open upper end portions on the frame in a side-by-side relation with their open end portions extending upwardly, picking-up scrap material from the pile and charging it into and filling each of the containers while they are on the frame in their backwardly declining positions, weighing the scrap material as charged into the containers, lifting the filled containers off the frame and moving them to side-by-side downwardly-backwardly declining positions on a charging machine, moving the filled containers on the charging machine to the preheating station, actively moving hot gas under positive fluid pressure at the preheating station into a bottom portion of each of the containers on the charging machine and upwardly through interstices of scrap material within the containers and out of the open end portions thereof into a discharge hood to thereby preheat the scrap material within the containers, moving the preheated scrap material within the containers on the charging machine into alignment with the open mouth of a furnace vessel at one of the furnace vessel charging stations, and progressively aligning each of the scrap containers with the open mouth of the vessel and tilting them on an arc into forwardly-downwardly declining positions to charge the vessel.

9. In a method as defined in claim 8, repeating the step by step procedure up through the preheating of the scrap material, then moving the preheated scrap material within the containers on the charging machine to a second furnace vessel charging station then progressively aligning each of the containers with the open mouth of a furnace vessel thereat and when aligned, selectively tilting each container through an arc into a forwardly-downwardly declining position to charge the vessel.

10. In a method as defined in claim 9, introducing the scrap material into each container in a graduated manner, and providing a substantially half depth of heavier weight portions thereof from the bottom end portion of each container upwardly therealong and providing lighter weight portions thereof from the upper end of the heavier weight portions to the open end portion of the container, whereby hot gases entering the container will first heat the heavier weight portions of the scrap material and finally the light weight portions thereof.

11. In an improved container for receiving and charging metal scrap into a melting and refining furnace vessel having an open mouth portion, a longitudinally extending hollow body having a closed bottom end wall and sidewall and an open top end, a hot gas inlet fitting on said sidewall of the container adjacent its bottom end wall for introducing preheating gases into the discharging a concentric inner shell wall spaced from said sidewall and extending along a length portion thereof from said back end wall, said inner shell wall defining a main chamber for receiving heavier weight scrap material therein, said inner shell wall also defining a cooling spacing about and with respect to said sidewall, air inlet and outlet portions in said sidewall for introducing cooling air into and exhausting heated air from the spacing, an upper extension portion of outwardly diverging shape closing-off the upper end of the spacing and defining a scrap receiving extension chamber of said container for receiving relatively light weight scrap material, and said upper extension portion having an upwardly divergent open end for dischargin cooled gases from the container.

12. In a scrap container as defined in claim 11, a pair of reinforced pins extending outwardly from opposite sides of said sidewall adjacent said bottom end wall, a pair of forwardly positioned pins extending from opposite sides of said sidewall towards and along said upper extension portion, and a backwardly projecting eyelet on said bottom end wall.

13. In a charging machines for receiving at least one metal scrap container having an upper open end portion and for moving the container from a scrap preheating backwardly downwardly declining position to a furnace charging position and at the furnace charging position for tilting the container through a reverse plane to a forwardly-downwardly declining position to deliver scrap material through its open end portion into a furnace, a wheeled vehicle for movement along a plant area between scrap container receiving and furnace charging positions, means carried by said vehicle for actuating it to move it between said positions, said vehicle having upper and lower frames, at least one swing carriage for carrying the container in a supported position thereon, said carriage extending transversely between opposite sides of said vehicle and having a front end portion pivotally mounted on said upper frame adjacent a delivery side of said vehicle, a fluid motor means pivotally mounted on said lower frame and projecting upwardly towards said upper frame, said motor having a group of pistons that are telescopically operably mounted with respect to each other, an inner piston having an eyelet extending upwardly therefrom and operatively pivotally connected to said swing carriage behind its pivot mounting, said carriage having an initial backwardly declining position adjacent the opposite side of and on said vehicle when said motor means is in a collapsed position, and said carriage being swingable on its pivot mounting upwardly through an arc into a forwardly-downwardly declining furnace charging position adjacent the delivery side of said vehicle by expansion-actuation of said motor.

PO-1050
(5/69)

UNITED STATES PATENT OFFICE
CERTIFICATE OF CORRECTION

Patent No. 3,589,692            Dated June 29, 1971

Inventor(s) Ira W. Lakin

It is certified that error appears in the above-identified patent and that said Letters Patent are hereby corrected as shown below:

Column 3, line 38, change "hat" to --hot--.

Column 4, line 11, before the period add --45--; line 17, change "backs" to --back--; line 24, after "constructed" change "t" to --to--; line 57 (claim 3), change "material" to --machine--; line 70, (claim 5), before "therein" delete "and".

Column 5, line 8 (claim 7), before "container" insert --the--; line 14 (claim 8), after "station" insert --and furnace vessel charging stations; at the loading and weighing station--; line 30 (same claim), after "open" insert --upper--; line 43 (claim 9), after "station" insert --, at the second furnace vessel charging station--; line 56 (claim 10), change "light" to --lighter--.

Column 6, line 8 (claim 11), change "discharging" to --container,--; line 20 (same claim), correct the spelling of "discharging"; line 28 (claim 13), change "machines" to --machine--.

Signed and sealed this 4th day of January 1972.

(SEAL)
Attest:

EDWARD M. FLETCHER, JR.        ROBERT GOTTSCHALK
Attesting Officer                Acting Commissioner of Patents